United States Patent

[11] 3,563,482

[72] Inventor Samuel H. Auld
Newport Beach, Calif.
[21] Appl. No. 799,015
[22] Filed Feb. 13, 1969
Division of Ser. No. 467,599, June 28, 1965,
Pat. No. 3,482,792
[45] Patented Feb. 16, 1971
[73] Assignee Gates Learjet Corporation
Wichita, Kans.
a corporation of Delaware

[54] MAGNETIC TAPE CARTRIDGE CONSTRUCTION
3 Claims, 8 Drawing Figs.

[52] U.S. Cl. .......... 242/55.19;
220/4; 220/59; 242/197
[51] Int. Cl. .......... B65h 17/48
[50] Field of Search .......... 242/55.19A,
55.19, 55.13(242-197-200);
179/100.2(2); 352/78, 128; 220/59, 4C, E;
206/52, 52F

[56] References Cited
UNITED STATES PATENTS
3,241,781 3/1966 Knox .......... 242/55.19(A)
3,311,316 3/1967 Williams .......... 242/55.19(A)

*Primary Examiner*—Billy S. Taylor
*Attorney*—Richard A. Marsen

ABSTRACT: The endless magnetic tape cartridge described contains a single reel of tape in spiral array on a rotatable platform. When in play operation, the inner turns are withdrawn causing the reel to rotate with the platform. The tape is transported beyond the transducer and thereupon presented as outer turns onto the reel. The housing of the cartridge is constructed of a mating rectangular base and cover, of tough molded material. Arrangements are herein provided along the sidewalls of the base and cover to maintain their assembly stable despite rough handling or drop onto a hard floor.

INVENTOR,
SAMUEL H. AULD

BY Richard A. Marsen

ATTORNEY

INVENTOR,
SAMUEL H. AULD

BY *Richard A Marsen*

ATTORNEY

INVENTOR,
SAMUEL H. AULD

BY Richard A. Marsen

ATTORNEY

INVENTOR,
SAMUEL H. AULD
BY Richard A Marsen
ATTORNEY

MAGNETIC TAPE CARTRIDGE CONSTRUCTION

This patent is a division of my copending parent application for "Endless Tape Cartridge" Ser. No. 467,599 filed Jun. 28, 1965, now U.S. Pat. No. 3,482,792 and assigned to the assignee hereof.

BACKGROUND OF THE INVENTION

This invention relates to magnetic tape cartridges that contain the tape in endless array, and more particularly to such cartridges formed with rectangular base and cover that are subject to rough usage. Convenient prerecorded cartridges and associated players for automobile and home entertainment are now widely accepted. Such mass-produced cartridges are best made as foolproof and foulup proof as practicable, as well as inexpensive in design.

The type of magnetic tape cartridge to which the present invention is directed is typified by that shown and described in the U.S. Pat. No. 3,403,868 of William P. Lear for "Magnetic Tape Cartridge System." A player for transcribing such cartridge is illustrated in U.S. Pat. No. 3,437,762 of William P. Lear and Samuel H. Auld for "Multi-Track Tape Cartridge Player."

The cartridges contain magnetic recordings playable with good quality hundreds of times. Distortion of the cartridge assembly could interfere with its transcription, cause tape foulup, or render it worthless. Impact, as by dropping on its side, or warpage as by exposure to the sun, tend to displace or separate base and cover at their seam. Merely joining the base and cover with a machine screw is insufficient to overcome the aforesaid problem.

SUMMARY OF THE INVENTION

An important object of this invention is to provide means molded integrally with the cartridge base and cover, that inhibit their displacement, distortion or warpage. Such means include simple members arranged to strengthen the assembled cover and base against lateral displacement at their juncture or seam. They are molded into base and cover respectively, and provided at negligible cost. With the use of tough plastic material, a rugged and sturdy cartridge is had.

A number of short lips project from sidewalls of the cover (or base), at the interior so as to protrude into the corresponding opposite sidewall regions. Further, a series of pins are molded to project from each side of the base (or cover) for close engagement with corresponding apertures in the opposite walls. Said sets of lips and pins may be used together, or alone, in a cartridge construction. Together they afford stronger resistance against lateral displacement of the cartridge housing halves. In the exemplary form of the invention, pairs of such pin/apertures serve additionally as mounting posts for rotatable or guide members of the cartridge.

DETAILED DESCRIPTION

Figure 1:
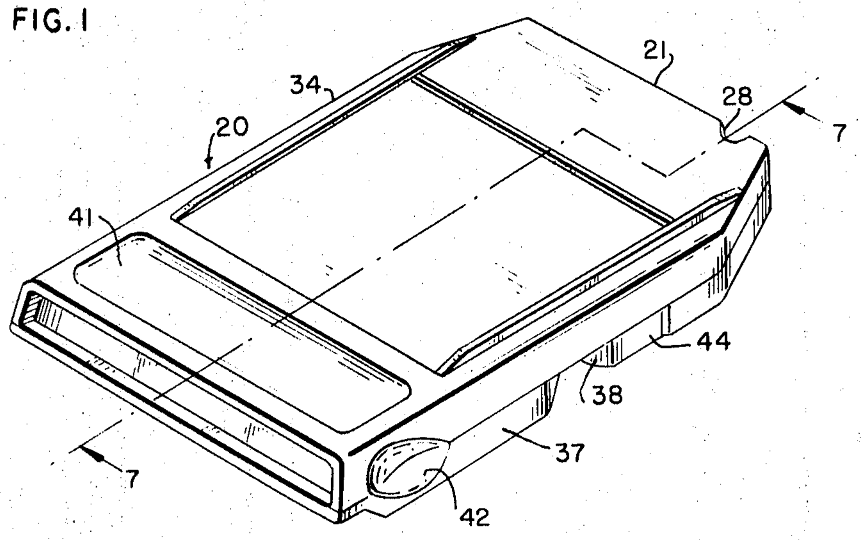
FIG. 1 is an exterior showing the exemplary cartridge, in perspective view.

The endless tape cartridge 20 is constructed of tough molded plastic components in rugged assembly, and relatively inexpensive for mass production and mass marketing. Cartridge 20 is an essentially self-contained unit, with a reel of tape in endless array therein. The forward end 21 of cartridge 20 is inserted into the player. A pinch roller 22 is resilient and rotatably mounted on a fixed post 23. When cartridge 20 is fully and operatively inserted pinch roller 22 is engaged with drive capstan 24, with the adjacent magnetic tape 25 pressed therebetween. Steady rotation of capstan 24 in the direction indicated by arrow *a* causes the traverse or movement of tape 25 at a uniform velocity across head 27 for reproduction of the recordings on the magnetic tracks on the tape. A semicircular forward cutout 28 permits capstan 24 to somewhat enter the cartridge end 21 and coact with the contained roller 22 and tape 25. A spring-pressed pad 29 stably holds the tape against head 27.

The region within the player for containing the cartridge has two parallel sidewall guides 30,31 indicated by dashed lines. Two spaced rollers are rotatably supported in side 30, and have their operative surfaces project to coact with the adjacent side 34 of the cartridge. A retention roller 35 is rotatably mounted on a leaf spring 36 and is biased beyond the sidewall 31 towards the side 37 of the cartridge. Rollers 32,33 minimize friction along cartridge side 34 as it is inserted in or removed from the player. Roller 35 when engaged with notch 38 in side 37 provides a force component pressing the forward end 21 of the cartridge against the contained pinch roller 22 and tape 25 against capstan 24.

As the cartridge is inserted into the player, a forward ramp 40 initially engages retention roller 35 as indicated schematically at 35′. Roller 35 thereupon rolls over the inclined surface of ramp 40 and is smoothly displaced to the cartridge side 37. Full cartridge insertion results in its engagement with capstan 24 as aforesaid, and the latching of roller 35 into notch 38 at the predetermined position to effect the play mode. A top finger grip area 41 extends laterally across the upper region of the cartridge rear. Adjacent finger cavities 42,43 are in sides 37 and 35 respectively. Shallow notch 44 ahead of and adjacent to notch 38 is used for holding the cartridge in the player, through roller 35, for either radio-play or no-play.

Figure 2:
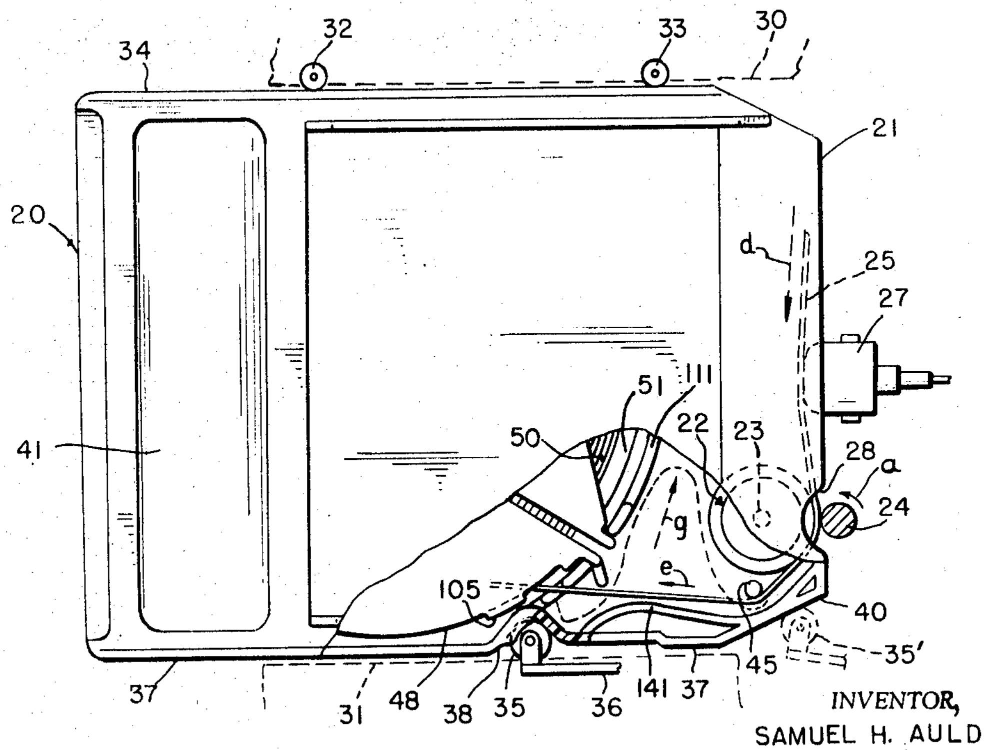
FIG. 2 is a plan view of the cartridge in play position, with its cover partially broken away.
Figure 4:
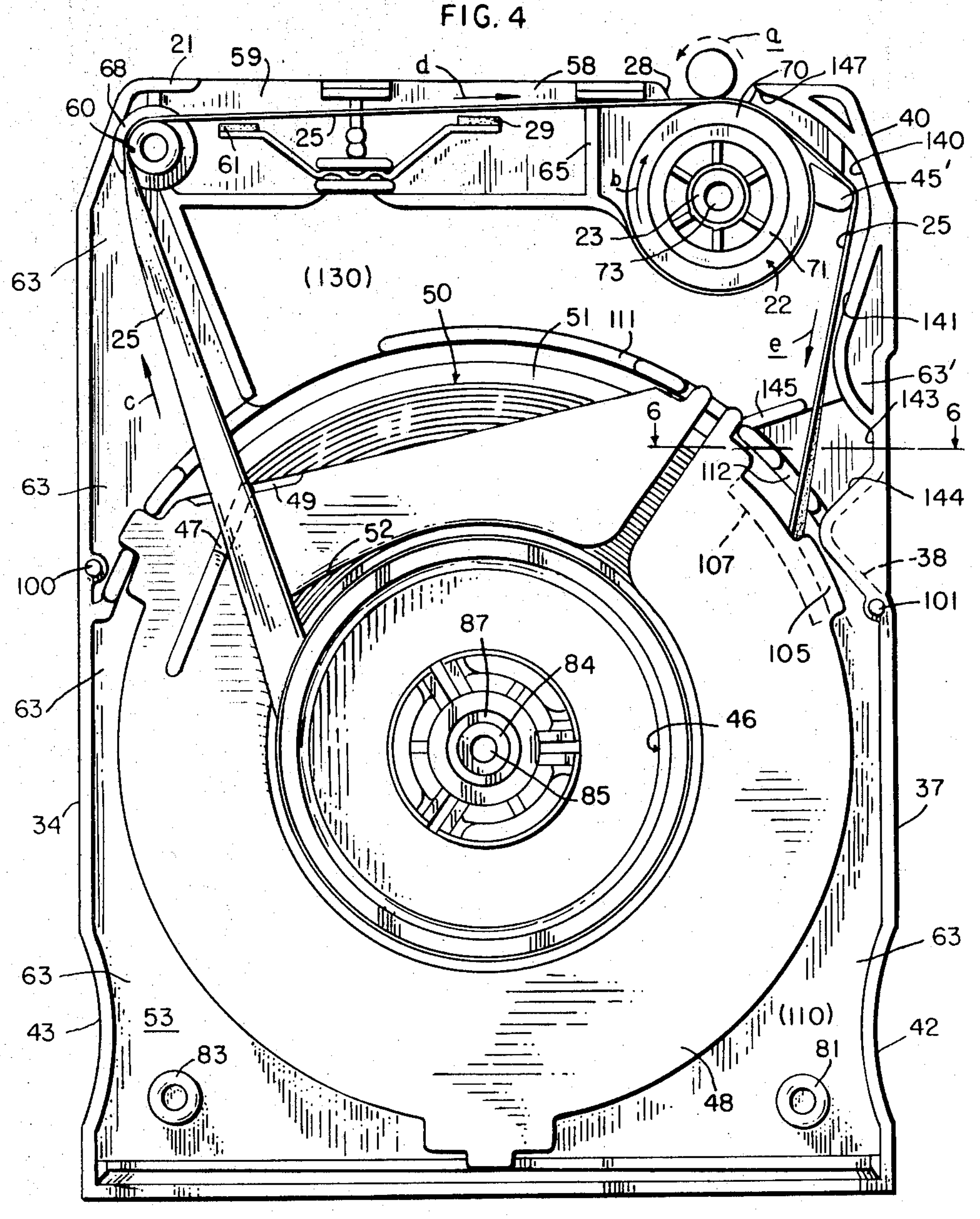
FIG. 4 is an enlarged plan view of the cartridge hereof, with the cover removed, in its normal play array.

The magnetic tape 25 is trained over a fixed guide post 45 and is drawn directly onto the tape reel 50 to become the outer convolutions thereon, as shown in FIGS. 2 and 4. Rotation of capstan 24 in the counterclockwise direction, arrow *a*, operates pinch roller 22 clockwise per arrow *b*, and the exposed loop of tape 25 in the directions indicated by arrows *c*, *d*, *e*. The tape 25 is payed out at the inner convolution about central hub 46, in the direction of arrow *c* across adjacent inclined ramp 47 on overreel wafer 48, and then around fixed guidepost 60. The tape reel 50 is supported on rotatable spool platform 51. Wafer 48 is concentric about the central hub, and contains a shaped cutout 52 to effect smooth unruffled tape payout, and is smooth at region 49.

Figure 3:
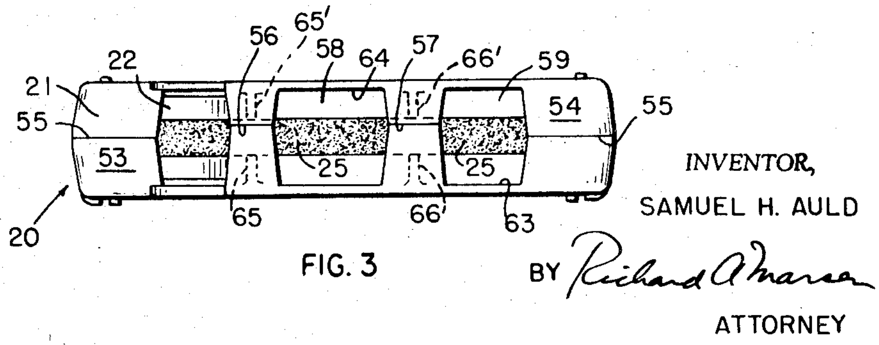
FIG. 3 is a front view of the cartridge of FIG. 1.

As seen in the front view, FIG. 3, the base 53 and cover 54 mate as a unitary cartridge assembly, generally along a central plane at edges 55. The tape section 25 is moved across the frontal openings: 28 at the pinch roller 22; 58 for entry of the pickup head 27; and 59 for entry of "end-of-track" sensor (not shown). Two spaced central uprights define the extend of the three frontal openings, and latch over edge-to-edge along joints 56,57 respectively. The tape 25 is supported and guided horizontally, centrally along the frontal openings 28,58,59, by a series of internal guides 65,65′ and 66,66′ spaced apart just a bit more than the tape width. A transverse rib 67 extends from post 45′; a companion rib 67′ (FIG. 5) overlies rib 67. Similarly, an annular rib 68 surrounds guidepost 60, and the companion ring 68′ in cover 54 overlies ring 68 with the proper spacing.

Pinch roller 22 comprises a rubberlike tire 70 mounted about a central hub 71 that rotatably fits over post 23 molded with base 53. Post 23 has a central opening or hole 73 through it to coact with a pin 74 extending opposite it from cover 54, see FIGS. 4 and 5.

A plurality of pins or posts are molded integrally in the cover 54 herein, and a corresponding set of mating sockets or hollow posts are molded integrally in the base 53. These post socket pairs are located in a spaced balanced array in the cartridge, merged with other functions or elements, or independent in clear regions. In essence, the posts and sockets sets are molded to fit together by friction, each over a substantial area. This is effected, in the exemplary unit, by posts or pins depending from the cover 54 that are the order of one-fourth inch long and one-eighth inch in diameter.

The pins are slightly tapered and the forward end of each socket is rounded off, for ready assembly. By using tough but yieldable material for the cartridge base and cover and the sockets and posts molded integrally therewith, tight frictional engagement is effected across each post and socket pair. A material found to be effective and practical for this purpose is "Styron"No. 363 of Dow Chemical Company. It is in the polystyrene family, with added latex. The post socket grip pairs hereof are 23,74 which serves also as the pinch roller bearing post; 60,69 which is also a fixed tape guide; two rear corner pairs comprising posts 80, 82 extending from the cover 54, and companion sockets 81, 83 from the base 53. A further grip pair is used as bearing support for the spool-reel at center of hub 46; namely central upstanding bearing member 84 with through-aperture 85 integrally molded with base floor 53, and companion post 86 with cover 54 , see FIGS. 4 and 7. The inner sleeve 87 is of self-lubricating composition material and is freely rotatable on base post 84. A washer 88, as of "-Teflon" underlies a flange 89 of the spool base 51 to facilitate its easy turning. Also, a think Teflon sleeve 60' is preferably slipped over guidepost 60, as seen in FIG. 8, to better maintain a lubricated traverse of the tape thereat.

To emphasize the ruggedness and sturdiness of the assembled cartridge housing, and insure against its cover-base seam 55 parting in use due to impacts, warpage, etc. a number of lips project up from the cover sides (FIG. 5) at 90,91,92,93. They are molded contiguous with the sidewall interiors 95,96 so as to protrude into the base region and be flush with the corresponding interior sidewalls 97,98 of base 53. A further feature hereof is the provision of a pin 100 and 101 projecting up from each side of the base 53 for snug engagement with corresponding apertures 102,103 in the sidewalls of the cover 54. These pin apertures are arranged to resist lateral displacement of the cover and base members of the cartridge housing, as might occur when dropped on a hard surface. They are grip pairs holding sides of the cartridge halves together.

Figure 6:
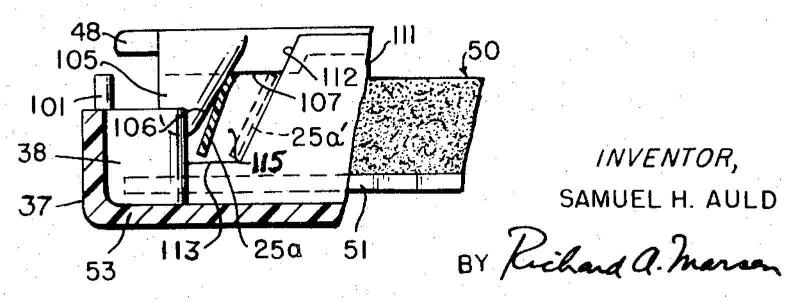
FIG. 6 depicts the tape entry section of the reel-spool chamber, as viewed from the line 6–6 of FIG. 4 in the direction of the arrows.

As shown in FIG. 6, the wafer 48 incorporates a depending tooth member 105. Tooth 105 is mounted adjacent to the entry location 25*a* of the tape loop 25 back into the tape reel 50 chamber 110, (see FIGS. 4 and 7). The side 106 of tooth 105 that faces the tape 25 at its entry is inclined in the manner illustrated. Inclined edge 106 is arranged to tilt the tape 25 from its substantially vertical orientation that it has when it leaves guidepost 45', for foulproof winding onto the tape reel 50 as outer convolutions. The exemplary inclination for edge 106 is about 35°from vertical. Without the use of a tooth as 105, the tape tends to "climb up" on the reel as it is wound on, in a helical manner, thickening the reel thereat until it contacts the superimposed wafer 48 which in turn causes frictional drag and end up as a fouled cartridge.

Figure 7:
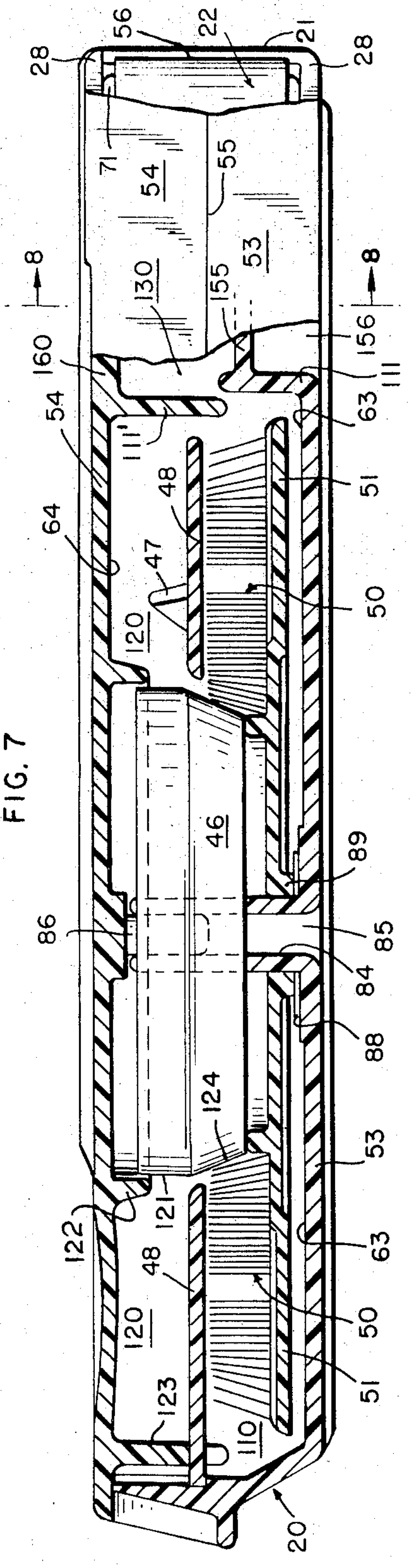
FIG. 7 is an enlarged transverse cross-sectional view through the cartridge, taken along the line 7–7 of FIG. 1.
Figure 8:
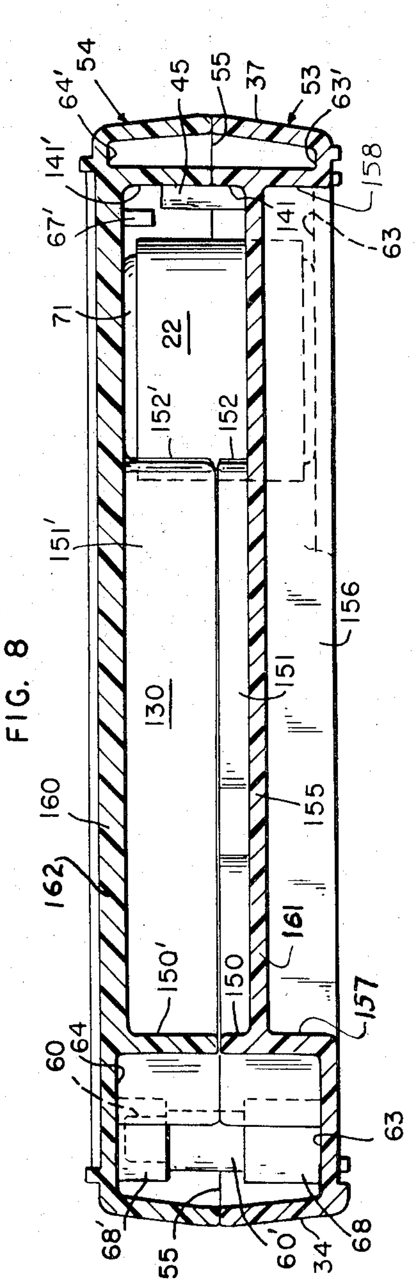
FIG. 8 is a vertical cross-sectional view of the cartridge, across its takeup chamber, taken along the line 8–8 of FIG. 7.

The inclined tooth 105 causes the tape 25 to lay onto the then outer convolutions in an angular condition leaning onto to reel 50, see FIG. 7. The result is no foulup, no reel thickening, and excellent spiral reeling-up of the tape onto the spool 51 in its operation. Additionally the underside 107 of the wafer 48 is thickened in the vicinity of and adjacent tooth 105, and below the basic wafer plane as shown in FIG. 6. The level of surface 107 insures that the vertical extent of entering tape 25*a* is substantially that of the reel 50 itself. This feature complements the action of the inclined tooth 105 for the stated purpose.

The annular surround rib 111 adjacent the said tape entry location is also formed with an inclined edge 112 substantially parallel to tooth edge 106. A bottom ridge 113 is formed in surround 111 below surface 107 and spaced therefrom only somewhat more than the tape width when the tape is at the same angle as surface 112, as indicated at 25*a'* in FIG. 6. The resultant vertical spacing of parallel surfaces 107 and 113 is thus less that the width of the tape per se, as is evident from the resultant parallelogram opening 115. In the presence of tape surplusage, its limpness changes its orientation in opening 115 to cause its "locking" thereat between the parallel surfaces 107 and 113. This is due to the greater width of the tape and the frictional engagement of its edges with surfaces 107,113 when it turns towards the vertical therebetween.

The reel chamber 110 comprises the region within which the reel 50 of tape is contained in its normal storage or reeling mode. Chamber 110 is generally defined as below the wafer 48 wherein the spool 51 and reel are rotatably supported. An arcuate rib wall 111,111' encloses chamber 110 between the spool-reel 50–51 and the forward end of the cartridge. Surrounds 111 and 111' are generally coextensive, and shield the reel and tape from entering the forward area of the cartridge from within chamber 110 therethrough. The remainder of reel chamber 110 extends to the rear section of the cartridge which mainly includes the adjacent open corner zones containing posts 81,83.

Figure 5:
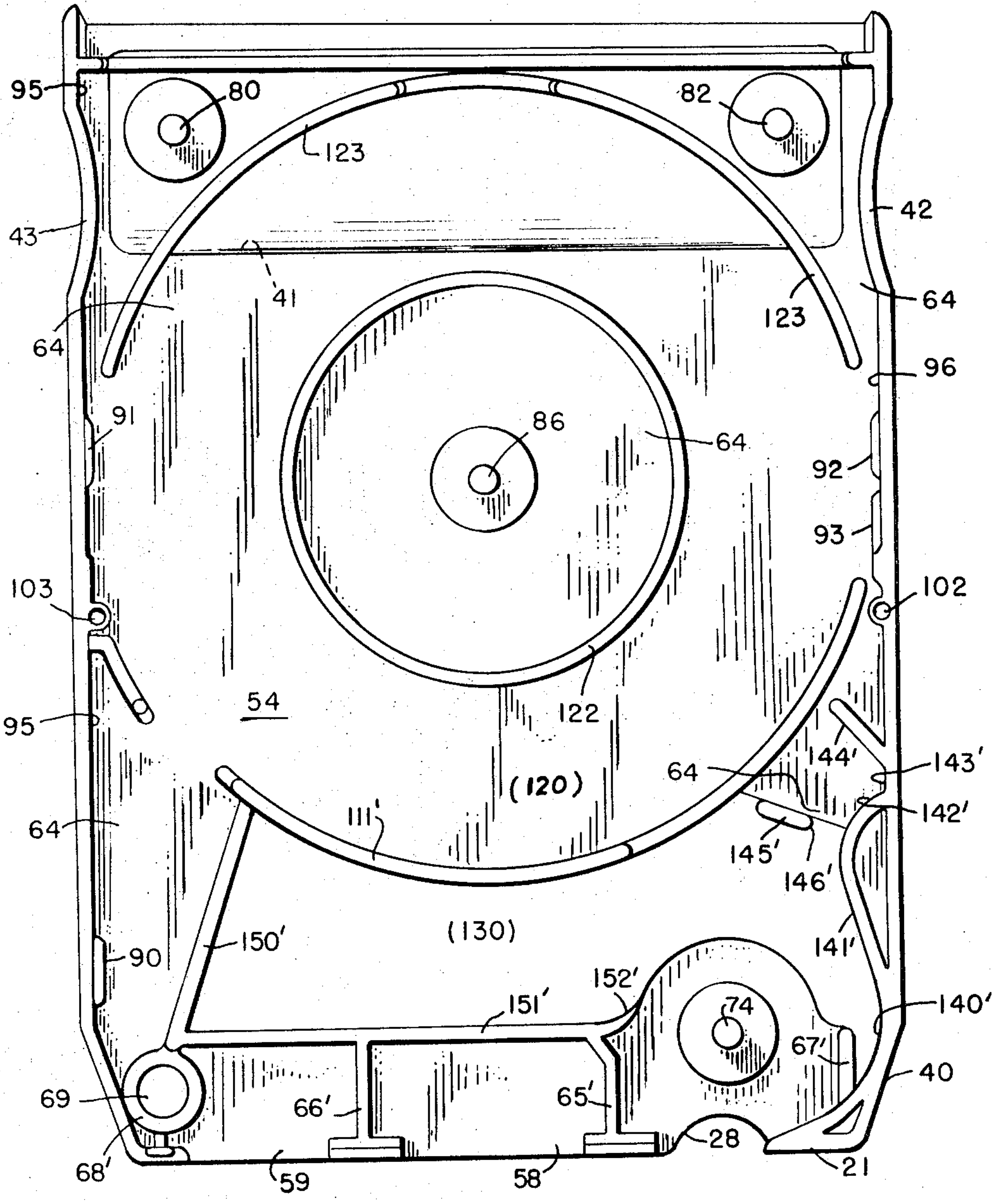
FIG. 5 is a plan view of the cartridge cover showing its interior.

Upper chamber 120 is of torroidal configuration formed above wafer 48: confined generally between the cylindrical hub extension 121 and annular ring or flange 122 overlapping cylinder 121 at the interior; the cover ceiling 64 and top surface of the wafer; and the outer arcuate surrounds 111' and 123; see FIGS. 5 and 7. The payed-out tape section 25 enters into upper chamber 120, normally passes over ramp 47 therein, and then out to guidepost 60,60' at the front end, not shown in FIG. 7 for the purpose of drawing clarity. There is a significant and important third chamber, namely the tape takeup chamber 130.

Two successive guide surfaces 140,141 are arranged in the vicinity of pinch roller 22 and guidepost 45', as seen in FIG. 4. Surfaces 140,141 are formed as a continuous wall surface projecting perpendicularly to base 53, together with mating companion surfaces 140'141' similarly projecting from cover 54 (FIG. 5) curved surfaces 140,141 function as tape directors in the surplus tape rectification. Reference is made to the parent patent application hereof for further details of their function and operation.

The wall 141,141' curves back at its far section 142 to side wall 37 in the vicinity of secondary notch 44. The inner wall portion 144 behind the main external notch 38 is inclined towards the entry region 112 of reel chamber 110. The straight small section of inner sidewall 143, together with the two diverging wall surfaces 143,144 form a tape-shaping zone adjacent the entry region 112. The corresponding mating wall surfaces of the cover are noted as 143',143' and 144'. A projecting prong or wall 145 with a curved tip surface 146 is in the vicinity of entry 112. The mating prong 145' extends from cover 54 and abuts and overlies wall 145 when assembled as a cartridge, with its rounded tip 146' coacting with tip 146. Its function is to insure that the tape loops are properly formed and readily enter the takeup chamber 120.

The takeup chamber 130 receives the surplus tape 135 in random scatter fashion when tape entry into reel chamber 110 backstops despite the roller-capstan 22,24 feed, as fully described and illustrated in said parent patent application. The incorporation of the desired floor and ceiling levels for chamber 130 is best provided with wall thicknesses of the order of those in the remainder of the cartridge, to conserve material and enhance mass-molding techniques. Towards this end the floor 155 of chamber 130 is formed as a shallow cavity 156 in the underside of base 53 as seen in FIGS. 7 and 8. The chamber floor 155 is thus raised as required, towards the ceiling 160. The thickness of the molded floor 155 is the same as that of the base 53, cover 54, and the adjacent vertical walls 157,158. The ceiling thickness may be made somewhat thicker as indicated at 160 if desired, over the area of chamber 130. The exemplary height of chamber 130, between floor surface 161 and inside ceiling surface 162 is desirably less than twice tape width.

I claim:

1. A cartridge for a rotatable coil of tape in endless configuration, constructed with a housing enclosing therein the tape coil, a pinch roller and a guidepost, a loop portion of the tape extending around the guidepost and pinch roller for its transcription action, said housing comprising a base section and a cover section each of molded material, said sections being formed with sidewalls that project towards each other and mate therealong, said base section having a plurality of socket-posts extending integrally upwards from its interior region to respectively rotatably carry said tape coil and pinch roller and one of which forms said guidepost, said cover section having integral pins respectively extending into openings centrally of said socket-posts, said pins and socket-posts being arranged as pairs that interlock and thereby firmly secure the cartridge sections together.

2. A cartridge as claimed in claim 1, in which the said pin and socket-post pairs are shaped and proportioned to respectively frictionally engage when said housing sections are pressed together.

3. A cartridge as claimed in claim 2, in which said pins are tapered and the forward end of the opening central of each companion socket-post is rounded off for ready joining together with its pin in firm frictional engagement.